United States Patent [19]

Diermayer et al.

[11] 4,272,013
[45] Jun. 9, 1981

[54] VENT CONTROL ARRANGEMENT FOR COMBUSTION APPARATUS

[76] Inventors: Werner Diermayer, 1275 Panorama Dr., Lafayette, Calif. 94549; Luitpold Kutzner, Marschnerstrasse 78, D-8000 Munich, Fed. Rep. of Germany

[21] Appl. No.: 41,877

[22] Filed: May 23, 1979

[51] Int. Cl.³ .......................................... G05D 23/08
[52] U.S. Cl. .................................. 236/1 G; 137/628; 236/93 R; 236/101 E
[58] Field of Search .......... 236/1 G, 43, 93 R, 101 E, 236/101 R; 137/628

[56] References Cited

U.S. PATENT DOCUMENTS

| | | | |
|---|---|---|---|
| 2,437,287 | 3/1948 | Woods | 236/93 R X |
| 3,095,147 | 6/1963 | Abrams | 236/93 R X |
| 3,219,141 | 11/1965 | Williamitis | 236/93 R X |
| 3,228,605 | 1/1966 | Diermayer et al. | 236/93 R |
| 3,510,059 | 5/1970 | Diermayer et al. | 236/93 R |
| 3,847,066 | 11/1974 | van der Ham | 236/93 R X |
| 3,895,646 | 7/1975 | Howat | 236/93 R X |

Primary Examiner—William E. Tapolcai, Jr.
Attorney, Agent, or Firm—Flehr, Hohbach, Test, Albritton & Herbert

[57] ABSTRACT

Thermally actuated damper for vents or flues of gas-fired heating appliances having bimetallic slotted blades each of which performs both the sensing and the closing function. In the present invention the slots, which are necessary to enable the bimetal blade to flex in the desired direction, are covered, or eliminated, or substantially reduced for a more complete closure of the damper in the closed position.

5 Claims, 8 Drawing Figures

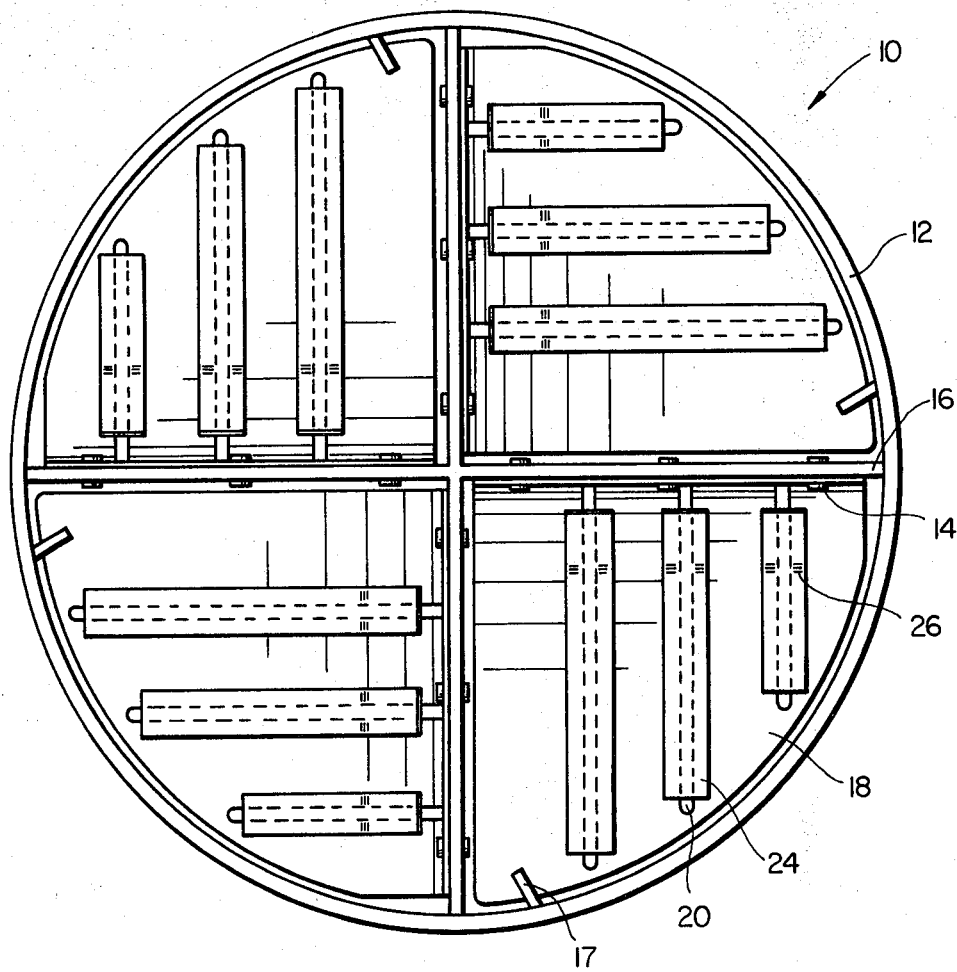
FIG_1
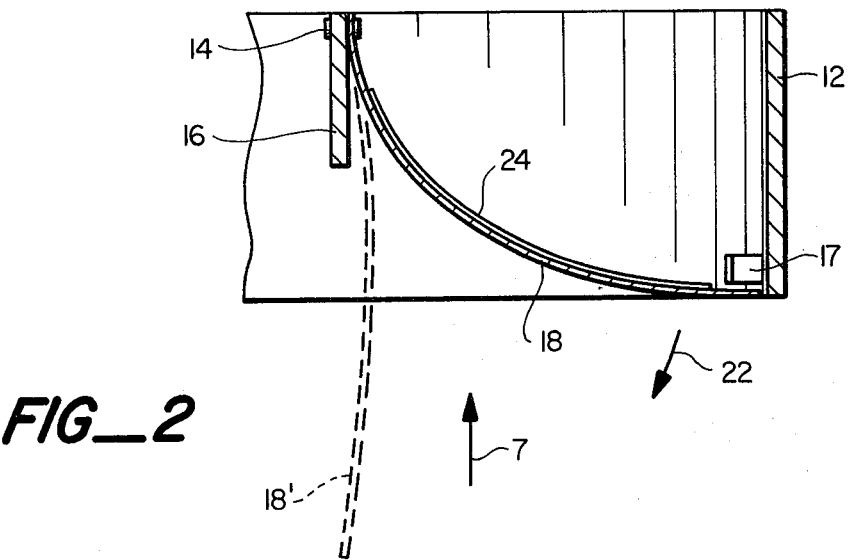
FIG_2

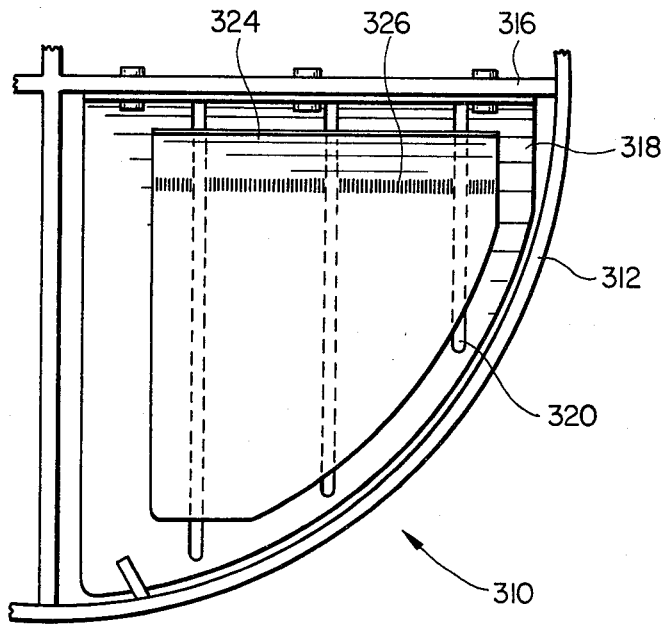
FIG_3
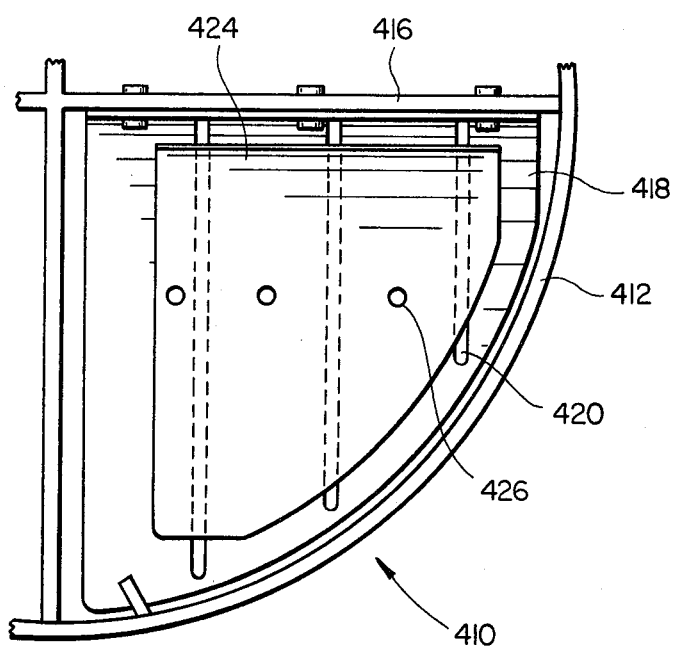
FIG_4

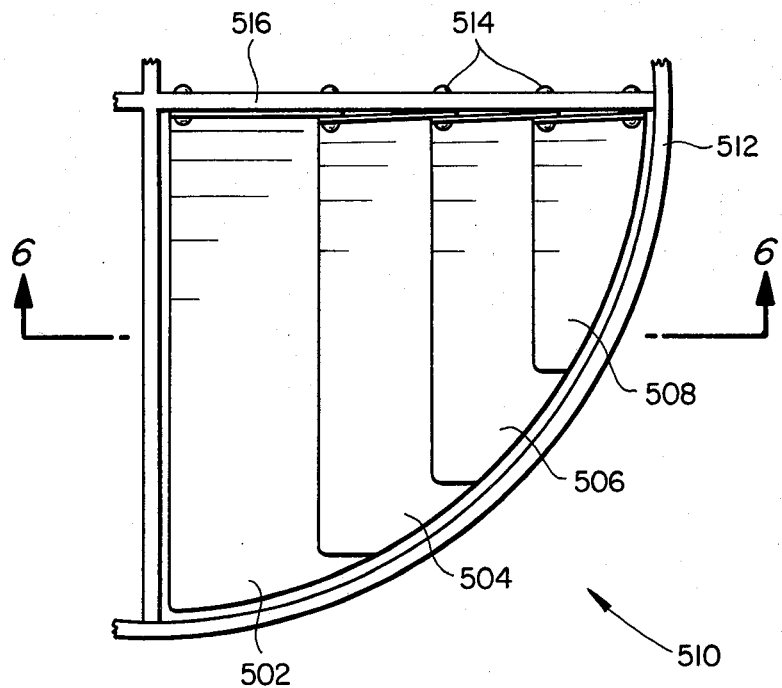
FIG_5
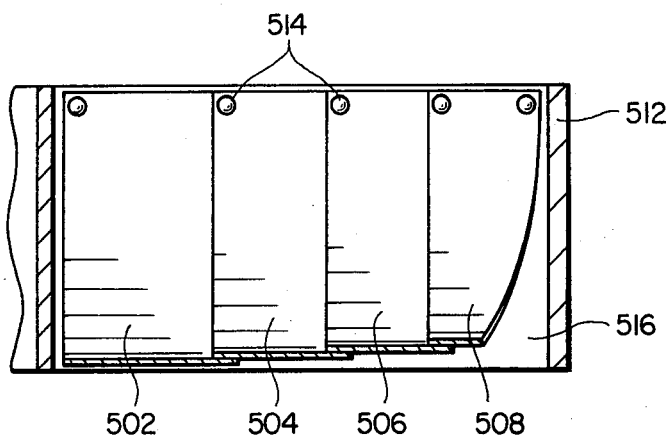
FIG_6

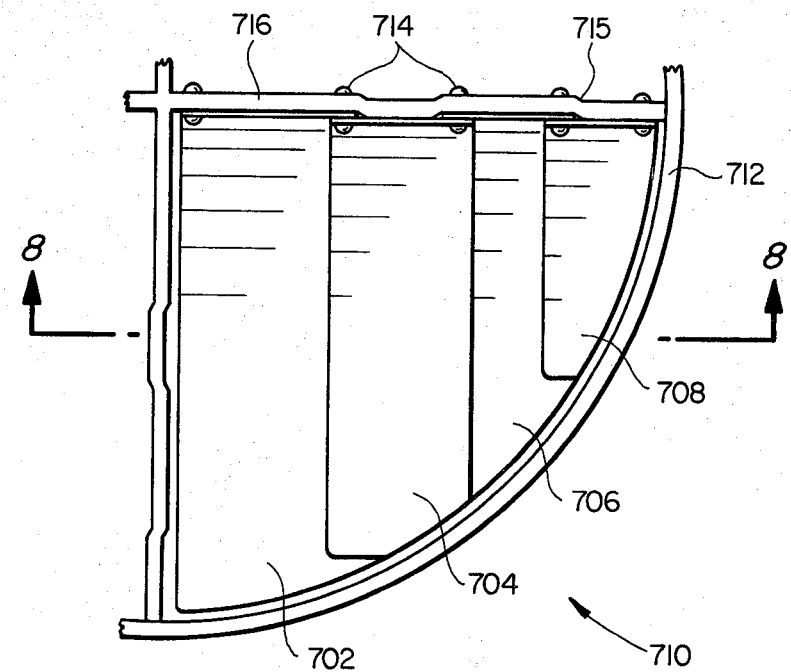
FIG_7
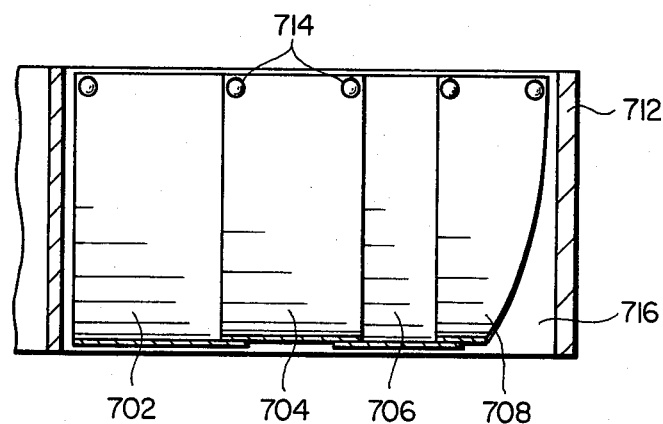
FIG_8

VENT CONTROL ARRANGEMENT FOR COMBUSTION APPARATUS

Thermally actuated dampers for vents and flues of gas-fired heating appliances are known in the prior art. Also known are thermally actuated dampers in which one part, a bimetal blade, performs both functions of sensing the temperature of the flue gases and of closing the vent or flue passage. Such a design eliminates bearings, hinges, friction surfaces and connecting or fastening means between sensing and closing components, thereby making the function of such a thermally actuated damper reliable over the life expectancy of the appliance in the unfavorable operating environment in the vent or flue.

The bimetal blades used for sensing the flue gas temperature and for opening and closing the vent or flue passage are slotted to allow maximum flexing of the bimetal in the desired direction. If a plane, round or square bimetal blade were not slotted, it would assume, upon being heated, a slightly spherical shape. In some cases the slots whose minimum width is dictated by the resistance of the narrow cutting tools to breakage, allow more than a desirable amount of air to flow through the damper in the closed position.

The main object of the present invention is to add to the above-described advantages of the bimetal blade as sensing and closing means in dampers the further benefit of a tighter closure in the closed position.

To achieve the object of the invention the slots are covered, at least partially by cover means in all embodiments which accompany the flexing movement of the bimetal blades without causing noticeable resistance to the movement. The slots may be covered by secondary bimetal strips having the same or similar deflection per unit of temperature rise as the main bimetal blade. In this case the secondary bimetal strips accompany the movement of the main bimetal blade without any resistance.

The slots may also be covered by a thin foil of metal or other heat resistant material which accompanies the flexing of the main bimetal blade at minimal resistance.

Several slots may be covered by one solid, or grid-shaped continuous cover means.

The cover means may be fastened to the main bimetal blade by bolting, riveting, welding or cementing, whereby the connection between main bimetal blade and cover means may be at one or several points, or along a line, or over a surface.

Instead of using a slotted bimetal blade and cover means, the effect of essential closure of the vent or flue passage can be achieved by using individual bimetal strips that overlap along their sides.

The foregoing and additional objects and features of the invention will appear from the following specification in which the embodiments have been set forth in detail in conjunction with the accompanying drawings:

FIG. 1 is a plan view of a typical thermally actuated damper incorporating a preferred embodiment of the invention.

FIG. 2 is a partial lateral section of the damper taken along the line 2—2 of FIG. 1.

FIG. 3 is a plan view of one quadrant of a thermally actuated damper incorporating another embodiment.

FIG. 4 is a plan view of one quadrant of a thermally actuated damper incorporating a third embodiment.

FIG. 5 is a plan view of one quadrant of a thermally actuated damper incorporating a fourth embodiment.

FIG. 6 is a lateral section taken along the line 6—6 of FIG. 5.

FIG. 7 is a plan view of one quadrant of a thermally actuated damper incorporating a fifth embodiment.

FIG. 8 is a lateral section taken along the line 8—8 of FIG. 7.

FIG. 1 shows a thermally actuated damper 10 having a cylindrical housing 12 with two diametral brackets 16 crossing at right angles at the center to form quadrants. Bimetal blades 18 are fastened to the brackets 16 by rivets 14 in the manner of a leaf spring fastened at one end and having a freely moving other end. This is also visible in FIG. 2. Bimetal blades 18 are provided with opening means or slots 20. As used herein the term opening means includes the slots of the embodiments of FIGS. 1-4 as well as the interfaces between adjacent strips of the embodiments of FIGS. 5-8. In plan view each bimetal blade covers one quadrant.

In FIG. 2 the curvature of the bimetal blade 18 in the cold, or closed, position is shown. The tip of bimetal blade 18 touches stop 17. In designs where the bimetal blade, in the closed position, has less than 90° curvature the stop may be omitted. In such a design the free end of the bimetal blade, in closed position touches housing 12.

When the appliance main burner ignites and the hot flue gases rise to the damper location the bimetal blades uncurl in the direction of arrow 22 in FIG. 2 and thereby start to open the flue or vent passage. The maximum open position is indicated by dashed line 18'.

The slots 20 of bimetal blades 18 are covered by secondary bimetal strips 24 which touch the main bimetal blade 18 and cover most of the length of the slots. As used herein the term covering means includes the secondary strips of this embodiment as well as the foil of the embodiments of FIGS. 3 and 4 and the interfaces of the embodiments of FIGS. 5-8. They are fastened to the main bimetal blade by welding, or cementing with a heat-resistant adhesive at 26. The secondary bimetal strip 24 is selected to correspond in its thermal response to the thermal deflection of the main bimetal blade 18 so that they remain in touch, yet do not affect each other's movement.

In another embodiment of FIG. 3 one of four identical quadrants of damper 310 is illustrated. Housing 312 and brackets 316 of the damper are identical to those shown in FIG. 1. The slots 320 of the bimetal blade 318 are covered by thin metal foils 324. The foils are fastened to bimetal blade 318 by a seam of welding or cementing 326.

FIG. 4 provides another embodiment with one quadrant of the damper 410 being illustrated. Housing 412 and brackets 416 are identical to those of FIG. 1. The slots 420 of bimetal blade 418 are covered by a thin metal foil 424 which is fastened to the bimetal blade by three rivets or bolts 426.

The operation of the embodiments of FIGS. 3 and 4 is similar to that of the embodiment of FIG. 1.

Welding, cementing or similar fastening methods may be used to bond the entire surface of the cover means to the bimetal blade. Alternately, bonding may also be provided along lines which may run perpendicular to the slots, as in FIG. 3, or parallel to the slots, or bonding may be provided at one spot or several spots.

The cover means may also consist of a metal foil, a heat resistant plastic foil, or mica. The cover means may consist of narrow strips, each of which covers one slot, or of sheet-like, or grid-shaped foil or bimetal, covering more than one, or all, slots.

In some applications of vent or flue dampers a complete closure is not desirable. The flue gases emanating from a continuous pilot flame, for example, must be vented through the closed damper. Small openings in the damper also help to accelerate the opening movement of thermally actuated dampers upon ignition of the appliance main burner by allowing, during the first few seconds, more heat transfer between the rising flue gases and the bimetal. For these reasons it may be desirable to cover the slots only partially by the above-described cover means. In FIGS. 5 and 6 another embodiment is provided and it illustrates one of four identical quadrants of damper 510. Housing 512 and brackets 516 of the damper are identical to those shown in FIG. 1. The bimetal blades for sensing the temperature and for opening and closing of the vent passage consist of a number, in this embodiment four, bimetal strips 502, 504, 506 and 508 which are shingled or overlapping with their interfaces in surface-to-surface contact at their sides. When in closed position the interfaces serve as covering means to prevent flow of gases between them. When in open position the interfaces separate and serve as opening means to vent gases. Each strip is fastened by two rivets 514, or other fastening means to bracket 516. If the designed curvature of the strips, in their cold, closed position is less than 90 degrees over their entire length they do not need a stop. Their closing movement is stopped by touching the housing 512 at an acute angle. If the curvature is 90 degrees in the low temperature range the strips move approximately parallel to the sides of the housing. In this case stops, similar to those shown in FIGS. 1 and 2 may be used to limit the closing motion of the bimetal strips.

When the appliance main burner ignites and hot flue gases rise to the damper location the strips start to open whereby strip 502 starts moving sooner than the other strips since its entire lower surface is impinged by the hot flue gases while the overlapped portions of the other blades are shaded from contact with hot flue gases until the lower strip starts moving away from its closed position. The same effect prevails on subsequent strips to the effect that they all open in sequence, starting with strip 502.

Although the time interval of the initial movement from the closed position between one strip and the next is on the order of only one second the resulting gaps between strips cause a considerable increase in free passage for flue gases. However on the return from the open to the closed position, while the temperature at the damper location decreases, the effect is neutralized or to some degree reversed so that the strips touch along their overlapping sides. The hysteresis thereby created in the relationship of temperature to vent passage is advantageous since a faster increase of the vent passage upon ignition of the appliance main burner reduces the chance for spillage of flue gases at the draft hood relief opening while a faster closure after main burner shutoff increases energy savings. FIGS. 7 and 8 provide another embodiment showing one of the four identical quadrants of a damper 710. The damper includes housing 712 and brackets 716 which are similar to those shown in the previous embodiments. Bimetal strips 702, 704, 706 and 708 are used to close the vent passage. Instead of a shingled arrangement of the strips, as in FIGS. 5 and 6, the strips overlap by alternately being placed below and above each adjacent one in surface-to-surface contact at their sides so that in closed position the interfaces at the contacting surfaces between the strips prevent flow of air between them. Each of the strips is fastened to bracket 716 by two rivets 714, or by other fastening means. Brackets 716 are provided with small offsets 715 to compensate for the thickness of the overlapping bimetal strips.

When the appliance main burner ignites and hot flue gases rise to the damper location the bimetal strips start to open. Strips 702 and 706, being exposed over their entire lower surface to the hot flue gases, open sooner than strips 704 and 708 which are shaded from contact with the hot gases along their lateral edges until the adjacent strips move away from their closed position. During the start of the opening movement the gaps between the strips cause a rapid increase of the free vent passage. The gaps disappear at, or before, the start of the return movement from the open to the closed position. The hysteresis thereby created in the relationship of temperature to vent passage is advantageous since a faster increase of the vent passage upon ignition of the appliance main burner reduces the chance for spillage of flue gases at the draft hood relief opening wile a faster closure after main burner shutoff increases energy savings.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A damper arrangement for controlling vent gases along a path from a gas-fired appliance comprising bimetal element means disposed in the path, said bimetal element means including a plurality of bimetal strips responding to temperatures of the vent gases and flexing across the path for opening and closing the flow of gases, elongate opening means formed between adjacent portions of the bimetal element means with the opening means extending lengthwise of the adjacent portions for permitting the same to flex into a changed shape, and means for covering the opening means when the bimetal element means is at or near a position closing the flow of gases, the covering means including means for mounting the bimetal strips with side margins thereof extending in overlapping relationship when closing the flow of gases, with the covering means presenting a minimum of resistance to flexing of the bimetal element means.

2. A damper arrangement as in claim 1 in which the bimetal strips overlap in shingled relationship for closing the flow of gases.

3. A damper arrangement as in claim 1 in which each bimetal strip is wider than the flow area it covers, and alternate strips overlap above and below adjacent strips for closing the flow of gases.

4. A damper arrangement as in claims 2 or 3 in which each bimetal strip responds to temperature change at a rate which differs from the rate of response of the strip adjacent thereto to create opening gaps between the adjacent strips during the initial opening movement of the damper.

5. A damper arrangement as in claim 2 or 3 in which each bimetal strip has a ratio of length to thickness which differs from the ratio of length to thickness of the strip adjacent thereto whereby the adjacent strips open at different rates responsive to rapid temperature increases so that gaps are created therebetween during the initial opening movement.

* * * * *